(12) United States Patent
Sumioka et al.

(10) Patent No.: US 7,515,631 B2
(45) Date of Patent: Apr. 7, 2009

(54) IMAGE PROCESSING APPARATUS AND IMAGE PROCESSING METHOD

(75) Inventors: Tetsuji Sumioka, Tokyo (JP); Mitsuaki Shiraga, Chiba (JP); Yukio Yanagita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1062 days.

(21) Appl. No.: 10/866,690

(22) Filed: Jun. 15, 2004

(65) Prior Publication Data

US 2005/0018915 A1     Jan. 27, 2005

(30) Foreign Application Priority Data

Jun. 16, 2003    (JP)   .............................. 2003-170277

(51) Int. Cl.
*H04B 1/66*     (2006.01)
(52) U.S. Cl. .......................... 375/240.01; 375/240.24; 375/240.25; 375/240.28; 375/240.26; 348/715; 348/716; 348/714; 382/233; 382/235; 382/234
(58) Field of Classification Search ............ 375/240.01, 375/240.25, 240.24, 240.28, 240.26; 348/715, 348/716, 714; 382/233, 235, 234
See application file for complete search history.

(56) References Cited

U.S. PATENT DOCUMENTS 5,491,515 A * 2/1996 Suzuki .................... 348/401.1

5,907,372 A * 5/1999 Oku et al. .................... 348/716

FOREIGN PATENT DOCUMENTS

JP       5-308622       11/1993

\* cited by examiner

*Primary Examiner*—Shawn An
(74) *Attorney, Agent, or Firm*—Oblon, Spivak, McClelland, Maier & Neustadt, P.C.

(57) ABSTRACT

An image processing apparatus able to encode and decode images by a low cost, small sized circuit configuration, having a temporary storage portion for temporarily storing data, an encoding/decoding processing portion for reading and writing data successively with respect to the temporary storage portion and encoding and decoding the image data in parallel, and a storage control portion for controlling the read and write operations of the data with respect to the temporary storage portion, wherein the storage control portion controls the read and write operations with respect to the temporary storage portion by the encoding/decoding processing portion in the encoding processing and at least read and write operations to the temporary storage portion by the encoding/decoding processing portion in the decoding processing so as to be performed within one frame's worth or one field's worth of processing period in a time division manner.

5 Claims, 7 Drawing Sheets

IMAGE PROCESSING APPARATUS AND IMAGE PROCESSING METHOD

BACKGROUND OF THE INVENTION

1. Field of the Invention

The present invention relates to an image processing apparatus able to encode and decode moving images in parallel, or encode the same moving image by a plurality of systems having different image qualities in parallel, and an image processing method thereof.

2. Description of the Related Art

In recent years, image recording and reproducing apparatuses which record moving images as digital data on recording media using the MPEG (Moving Picture Experts Group) or other compressive encoding schemes and reproduce the same have come under attention. Particularly, video recorders for home use able to write on digital versatile disks (DVD), hard disks, or both as recording media have become popular.

Some of the image recording and reproducing apparatuses using disk type recording media have the function of recording certain moving image content and reproducing other content recorded in the past in parallel or the function of recording content and reproducing the recorded part of the content during that operation, that is, "time-shift" reproduction. These functions are realized by recording and reproducing moving images simultaneously. At this time, for example MPEG encoding processing and decoding processing are simultaneously carried out. Conventional image recording and reproducing apparatuses have been provided with separate encoding circuits and decoding circuits for this purpose.

Further, there is also a demand for the functions of recording image data on recording media and simultaneously recording the same content at a different resolution, compression rate, or format to portable semiconductor memories or other recording media in parallel or transmitting it over a network. These functions are realized by carrying out the encoding processings for producing the image data simultaneously. Conventional image recording and reproducing apparatuses have carried out the processing using separate encoding circuits.

Japanese Unexamined Patent Publication (Kokai) No. 9-322121 discloses the following image decoding apparatus able to perform encoding processing of one system of data and decoding processing of another system of data in parallel. The decoding apparatus is provided with an inverse transform circuit used for both coding and decoding data. A signal input as a high efficiency encoded image signal and run through a variable length decoding circuit and an inverse quantizer circuit and an input image signal of another system are selected by a multiplexing circuit and input to the inverse transform circuit, the former signal is decoded at and output from the inverse transform circuit, and the latter image signal is encoded at the inverse transform circuit, then output via a quantizer circuit and variable length coding circuit. Here, the inverse transform circuit is operated at two times or more the real time speed to enable the inverse transform circuit to be used and switched between the decoding function and the coding function and enable the decoding processing and the coding processing to be performed in parallel.

Summarizing the disadvantages to be overcome by the invention, when providing separate encoding circuits and decoding circuits for performing the encoding processing and the decoding processing of images simultaneously as described above, the circuit size is increased. Further, when providing a plurality of separate decoding circuits for producing image data having different resolutions in parallel, the circuit size similarly ends up being increased. To prevent an increase in circuit size, the method of having the circuits for encoding and decoding share a frame memory for temporarily storing image data may be considered. However, in this case, it is necessary to increase the data transfer rate of the frame memory, whereby the component becomes higher in cost.

SUMMARY OF THE INVENTION

A first object of the present invention is to provide an image processing apparatus able to perform encoding processing and decoding processing of images simultaneously by a low cost, small sized circuit configuration.

A second object of the present invention is to provide an image processing apparatus able to perform encoding processing of a plurality of systems of images simultaneously by a low cost, small sized circuit configuration.

A third object of the present invention is to provide an image processing method able to perform encoding processing and decoding processing of images simultaneously by a low cost, small sized circuit configuration.

A fourth object of the present invention is to provide an image processing method able to perform encoding processing of a plurality of systems of images simultaneously by a low cost, small sized circuit configuration.

To achieve the first and second objects, according to a first aspect of the present invention, there is provided an image processing apparatus able to encode and decode moving images having a temporary storage means for temporarily storing data, an encoding/decoding processing means for reading and writing data successively with respect to the temporary storage means and encoding and decoding the image data in parallel, and a storage control means for controlling the read and write operations of the data with respect to the temporary storage means, wherein the storage control means controls the read and write operations with respect to the temporary storage means by the encoding/decoding processing means in the encoding processing and at least read and write operations to the temporary storage means by the encoding/decoding processing means in the decoding processing so as to be performed within one frame's worth or one field's worth of processing period in a time division manner.

Here, the temporary storage means temporarily stores data from the encoding/decoding processing means etc. The encoding/decoding processing means reads and writes data with respect the temporary storage means successively and performs encoding processing and decoding processing of image data in parallel. The storage control means controls the read and write operations with respect to the temporary storage means.

However, the encoding/decoding processing means performs read and write operations with respect to the temporary storage means at a greater frequency and transfers a greater amount of data in the encoding processing compared with the decoding processing. Therefore, the storage control means controls the read and write operations with respect to the temporary storage means by the encoding/decoding processing means in the encoding processing and at least the read and write operations to the temporary storage means by the encoding/decoding processing means in the decoding processing so as to be performed within one frame's worth or one field's worth of processing period in a time division manner, whereby the read and write operations with respect to the temporary storage means are dispersed and, at the time of the decoding processing, read and write operations with respect to temporary storage means from other than the encoding/ decoding processing means become possible in parallel with this processing. For example, read and write operations with respect to the temporary storage means by an input image converting means for converting input image data to a predetermined data format and resealing it to generate image data for encoding processing by the encoding/decoding processing means or by an output image converting means for resealing the decoded image data generated by the decoding processing can be performed in parallel with the encoding processing. Therefore, even if performing the encoding processing and the decoding processing in parallel using a single encoding/decoding processing means and sharing a single temporary storage means at least in the encoding processing and the decoding processing, the access rate required for the temporary storage means can be suppressed.

According to a second aspect of the invention, there is provided an image processing method for encoding and decoding moving images in parallel, having reading and writing data successively with respect to a memory for temporarily storing data and encoding and decoding image data in parallel and controlling read and write operations with respect to the memory in the encoding processing and read and write operations with respect to the memory at least in the decoding processing so as to be performed within one frame's worth or one field's worth of processing period in a time division manner.

This image processing method reads and writes data successively with respect to the memory for temporarily storing data and encodes and decodes image data in parallel. The read and write operations with respect to the memory in the encoding processing and at least the read and write operations with respect to the memory in the decoding processing are controlled so as to be performed within one frame's worth or one field's worth of processing period in a time division manner. Here, the encoding processing performs read and write operations at a greater frequency and transfers a greater amount of data compared with the decoding processing. Therefore, the read and write operations with respect to the memory are dispersed, and at the time of the decoding processing, read and write operations accompanying processing other than encoding and decoding processing can be performed in parallel with this processing. Therefore, even when performing encoding processing and decoding processing by the same processing circuit in parallel, a single memory can be shared at least at the time of the encoding processing and at the time of the decoding processing and the access rate required for the memory can be suppressed.

Summarizing the effects of the invention, since the image processing apparatus of the present invention performs the encoding processing and the decoding processing using a single coding/decoding processing means and makes joint use of a single temporary storage means at least at the time of the coding processing and at the time of the decoding processing, enlargement of the circuit size is prevented. Further, by controlling the read and write operations with respect to the temporary storage means by the storage control means, the access rate required for the temporary storage means is suppressed and the component cost is lowered. Therefore, a small sized, low cost image processing apparatus able to perform coding and decoding of moving images in parallel can be realized.

Further, since the image processing method of the present invention makes joint use of a single memory at least at the time of the coding processing and at the time of the decoding processing even when performing the encoding processing and the decoding processing using the same processing circuit in parallel and controls read and write operations with respect to the memory at the time of the encoding processing and at the time of the decoding processing so as to be performed within one frame's worth or one field's worth of the processing period in a time division manner, the access rate required for the memory can be suppressed. Therefore, the circuit can be made smaller, and the component cost can be lowered.

BRIEF DESCRIPTION OF THE DRAWINGS

These and other objects and features of the present invention will be described in more detail with reference to the accompanying drawings, in which.

DESCRIPTION OF THE PREFERRED EMBODIMENTS

Below, preferred embodiments of the present invention will be explained with reference to the drawings. In the following explanation, as an example, assume the case of application of the present invention to an image recording and reproducing apparatus encoding and decoding a video signal and audio signal using the MPEG scheme.

Figure 1:
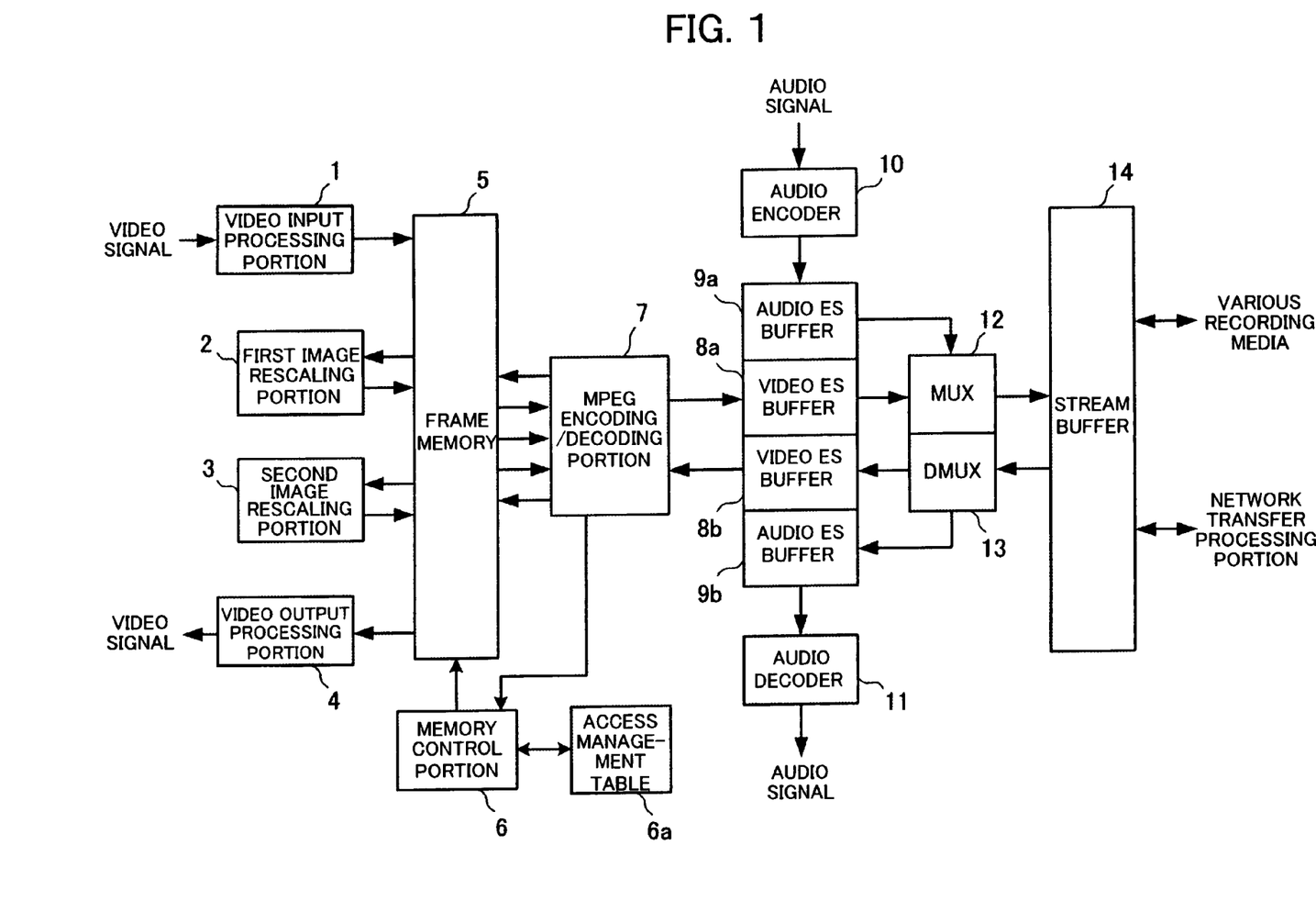
FIG. 1 is a block diagram of an example of the configuration of an image recording and reproducing apparatus according to an embodiment of the present invention.

FIG. 1 is a block diagram of an example of the configuration of an image recording and reproducing apparatus according to an embodiment of the present invention.

The image recording and reproducing apparatus shown in FIG. 1 has the function of receiving input of a video signal and audio signal, encoding them by the MPEG scheme, and recording them on various recording media or outputting them through a network and the function of decoding MPEG video data and audio data output from recording media or a network and reproducing and outputting the video signal and audio signal. The image recording and reproducing apparatus also has a video input processing portion 1, first image resealing portion 2, second image resealing portion 3, video output processing portion 4, frame memory 5, memory control portion 6, MPEG encoding/decoding engine 7, video elementary stream (ES) buffers 8a and 8b, audio ES buffers 9a and 9b, audio encoder 10, audio decoder 11, multiplexer (MUX) 12, demultiplexer (DMUX) 13, and stream buffer 14.

The video input processing portion 1 converts a video signal input from a television tuner or an external input terminal to digital image data expressed by a luminance signal (Y) and color difference signals (Cb and Cr) and having an information ratio of 4:2:2 (hereinafter, called a "4:2:2Y/Cb/Cr system") and stores this successively in the frame memory 5.

The first image resealing portion 2 reads the converted image data from the frame memory 5, converts it from the 4:2:2Y/Cb/Cr system to the format called the "4:2:0Y/Cb/Cr system", further rescales it to a predetermined image size, and writes it to the frame memory 5 again.

The second image resealing portion 3 reads the decoded image data from the frame memory 5, rescales it according to the format of the output side, then writes it to the frame memory 5 again. In the same way as the first image resealing portion 2, the second image resealing portion 3 can convert the image data read from the frame memory 5 from the 4:2:2Y/Cb/Cr system to the 4:2:0Y/Cb/Cr system, rescale it to a predetermined image size, and write it to the frame memory 5.

The video output producing portion 4 reads the image data rescaled by the second image resealing portion 3 from the frame memory 5, converts it from the 4:2:0/Y/Cb/Cr system to the 4:2:2Y/Cb/Cr system, converts this digital image data to an analog signal for example, and outputs the reproduced video signal to an external output terminal or monitor apparatus.

The frame memory 5 is a memory for image data shared by the video input processing portion 1, first image resealing portion 2, second image resealing portion 3, video output processing portion 4, and MPEG encoding/decoding engine 7 and is realized as a dynamic random access memory (DRAM) or other semiconductor memory.

The memory control portion 6 controls access to the frame memory 5 for read and write operations. For this purpose, the memory control portion 6 has an access management table 6*a* in which an access schedule to the frame memory 5 is written. The memory control portion 6 rewrites the access management table 6*a* in accordance with the processing carried out in the MPEG encoding/decoding engine 7, first image resealing portion 2, or second resealing portion 3 and receives a synchronization signal from the MPEG encoding/decoding engine 7 to control the frame memory 5 in accordance with the access schedule written in the access management table 6*a*.

The MPEG encoding/decoding engine 7 is a processing circuit able to perform both the encoding processing and the decoding processing of the MPEG scheme. The MPEG encoding/decoding engine 7 encodes the image data read from the frame memory 5 and successively writes this as a video stream to the video ES buffer 8*a*. The MPEG encoding/decoding engine 7 successively reads the video stream from the video ES buffer 8*b*, decodes it, and successively writes the result to the frame memory 5. In the encoding processing or decoding processing, the MPEG encoding/decoding engine 7 uses the frame memory 5 as the active region and outputs the synchronization signal to the memory control portion 6 at the timing of start of the processing in the macroblocks.

The video ES buffer 8*a* buffers the video stream produced by the MPEG encoding/decoding engine 7 and outputs it to the MUX 12. The video ES buffer 8*b* buffers the video stream output from the DMUX 13 and outputs it to the MPEG encoding/decoding engine 7.

The audio ES buffer 9*a* buffers the audio stream produced by the audio encoder 10 and outputs it to the MUX 12. The audio ES buffer 9*b* buffers the audio stream output from the DMUX 13 and outputs it to the audio decoder 11.

The audio encoder 10 converts the audio signal input from the television tuner or other external input terminal to digital data, encodes it by the MPEG audio scheme or the audio code number 3 (AC3) scheme, and successively writes the audio stream to the audio ES buffer 9*a*. The audio decoder 11 decodes the audio stream output from the audio ES buffer 9*b*, converts it to an analog signal for example, and outputs the reproduced audio signal to an external input terminal or amplifier.

The MUX 12 adds predetermined header data to the video stream and the audio stream from the video ES buffer 8*a* and the audio ES buffer 9*a* to multiplex them and successively writes the MPEG stream to the stream buffer 14. The DMUX 13 successively reads the MPEG stream from the stream buffer 14, demultiplexes it to the video stream and the audio stream, and writes these to the video ES buffer 8*b* and the audio ES buffer 9*b*.

The stream buffer 14 is connected to a reading/writing apparatus for recording to a hard disk, a DVD or other optical disk, a portable semiconductor memory, or other various recording media and to a transfer processing portion for an external network. The stream buffer 14 buffers the MPEG stream output from the MUX 12 and outputs it to the various recording media or network. The stream buffer 14 buffers the MPEG stream provided from the above recording media or network and outputs it to the DMUX 13.

Here, the basic operation in such an image recording and reproducing apparatus in the case of encoding and decoding a video signal and audio signal will be explained. When encoding a video signal and audio signal, the input video signal is converted at the video input processing portion 1 to digital image data of the 4:2:2Y/Cb/Cr system, then successively written to the frame memory 5. The digital image data is read out to the first image resealing portion 2 or the second rescaling portion 3 where it is reformatted to the 4:2:0Y/Cb/Cr system and rescaled, then is rewritten to the frame memory 5.

The image data is encoded by the MPEG encoding/decoding engine 7 and written as a video stream to the video ES buffer 8*a*. On the other hand, the audio stream encoded by the audio encoder 10 is successively written to the audio ES buffer 9*a*. Data is read from the video ES buffer 8*a* and the audio ES buffer 9*a* to the MUX 12 and multiplexed, whereby an MPEG stream is produced. This is written in the stream buffer 14. The MPEG stream read from the stream buffer 14 is written to the various recording media or output via the network.

When decoding a video signal, the MPEG stream read from the various recording media or received via a network is successively written to the stream buffer 14 and demultiplexed by the DMUX 13 into a video stream and audio stream. The audio stream is supplied via the audio ES buffer 9*b* to the audio decoder 11 and decoded to reproduce an audio signal. The video stream is written to the video ES buffer 8*b*, then successively read to the MPEG encoding/decoding engine 7, decoded, and written to the frame memory 5.

The decoded image data is rescaled by the second image resealing portion 3, rewritten to the frame memory 5, then read to the video output processing portion 4, where it is reformatted to the 4:2:2Y/Cb/Cr system and converted to an analog signal. The video signal is then reproduced and output.

Figure 2:
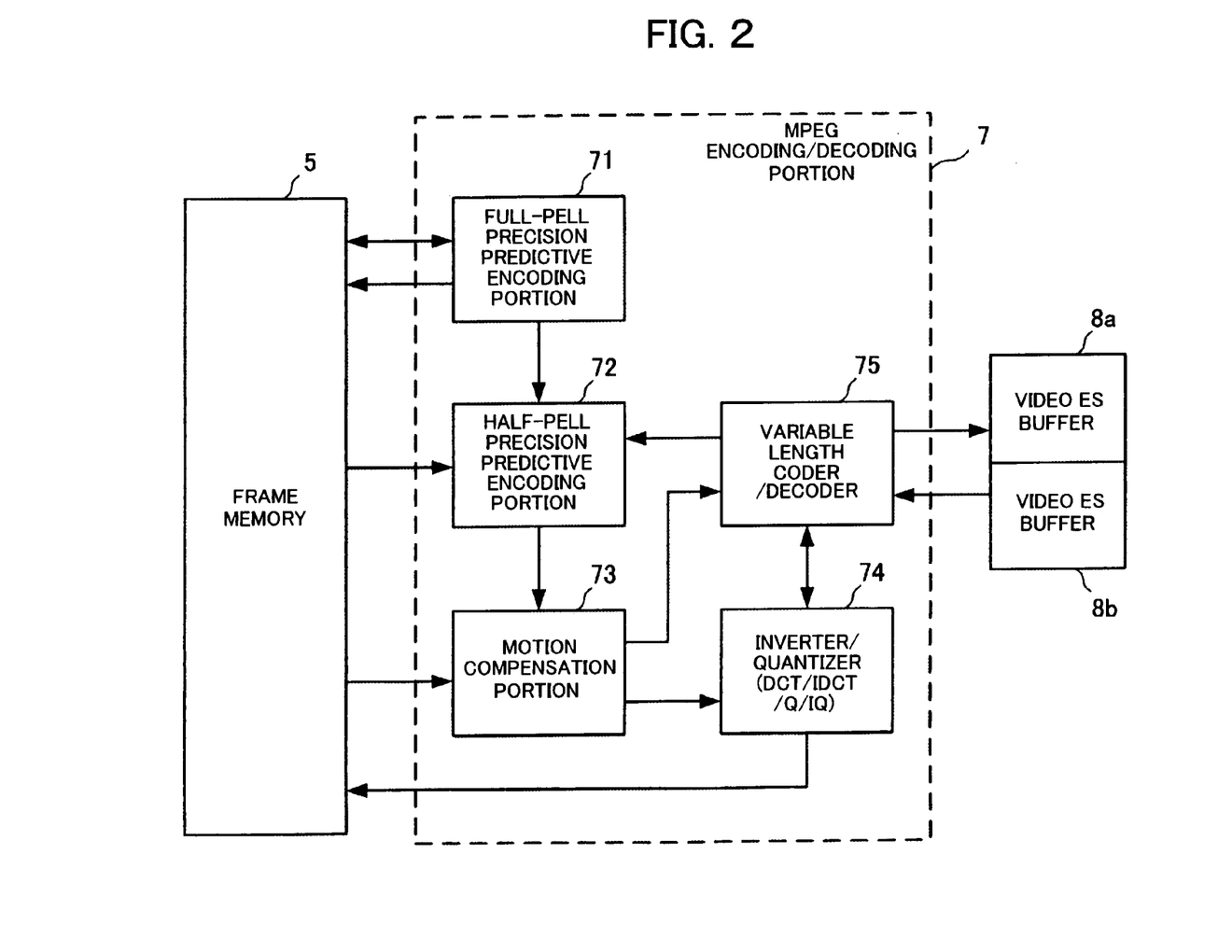
FIG. 2 is a block diagram of the internal configuration of an MPEG encoding/decoding engine.

Next, FIG. 2 is a block diagram of the internal configuration of the MPEG encoding/decoding engine 7.

The MPEG encoding/decoding engine 7 has a full-pell precision predictive encoding portion 71, half-pell precision predictive encoding portion 72, moving compensation portion 73, converter/quantizer 74, and variable length encoder/decoder 75. The MPEG encoding/decoding engine 7 operates at two operating modes: an encoding mode at the time of encoding processing and a decoding mode at the time of decoding processing.

The full-pell precision predictive encoding portion 71 operates only in the encoding mode. Specifically, it reads Y-image data from the frame memory 5, detects motion, generates full-pell precision motion vector data, and outputs this to the half-pell precision predictive encoding portion 72 and writes it to the frame memory 5.

The half-pell precision predictive encoding portion 72, in the decoding mode, detects motion of the Y-image data by using the motion vector data detected by the full-pell precision predictive encoding portion 71, generates half-pell precision motion vector data, and supplies it to the motion compensation portion 73 along with the Y-image data. Further, in the decoding mode, it transfers the motion vector data from the variable length encoder/decoder 75 along with the Y-image data to the motion compensation portion 73.

The motion compensation portion 73 carries out motion compensation on the Y-image data and Cb/Cr image data. In the encoding mode, it outputs the motion vector data to be encoded to the variable length encoder/decoder 75. Further, in the encoding and decoding operating modes, it outputs the MB parameter of the macroblock being processed, original image data, search image data, and differential image data to the converter/quantizer 74.

In the encoding mode, the converter/quantizer 74 applies a discrete cosine transform (DCT) and quantization to the image data from the motion compensation portion 73 and outputs coefficient data and the MB parameter to the variable length encoder/decoder 75. The converter/quantizer 74 applies an inverse discrete cosine transform (IDCT) to the coefficient data and outputs local decoded image data to the frame memory 5. On the other hand, in the decoding mode, the converter/quantizer 74 applies inverse quantization and IDCT to the coefficient data from the variable length encoder/decoder 75 to construct the decoded image, then outputs it to the frame memory 5.

The variable length encoder/decoder 75, in the encoding mode, encodes the motion vector data from the motion compensation portion 73 and the coefficient data and the MB parameter from the converter/quantizer 74 to generate a video stream and outputs this to the video ES buffer 8a. In the decoding mode, it decodes the video stream from the video ES buffer 8b, outputs the decoded motion vector data to the half-pell precision predictive encoding portion 72, and outputs the coefficient data to the converter/quantizer 74.

Below, the operation of the MPEG encoding/decoding engine 7 will be described for each operating mode. In the encoding mode, when the full-pell precision predictive encoding portion 71 is instructed to start encoding for one picture, the full-pell precision predictive encoding portion 71, half-pell precision predictive encoding portion 72, motion compensation portion 73, converter/quantizer 74, and variable length encoder/decoder 75 successively perform pipeline processing for every macroblock, whereby a video stream is output from the variable length encoder/decoder 75.

The full-pell precision predictive encoder/decoder 71 reads the Y-image data from the image data converted to the 4:2:0Y/Cb/Cr system and rescaled by the first image resealing portion 2 or the second resealing portion 3 and written to the frame memory 5 and detects motion. Then, the full-pell precision predictive encoding portion 71 produces full-pell precision motion vector data for every macroblock and outputs it to the half-pell precision predictive encoding portion 72. At this time, the produced motion vector data is buffered by the frame memory 5.

The half-pell precision predictive encoding portion 72 reads the Y-image data from the frame memory 5, detects motion based on the motion vector data from the full-pell precision predictive encoding portion 71, generates half-pell precision motion vector data, and outputs this along with the Y-image data to the motion compensation portion 73.

The motion compensation portion 73 carries out motion compensation for the Y-image data from the half-pell precision predictive encoding portion 72 and the Cb/Cr image data read from the frame memory 5 and outputs the motion vector data for encoding to the variable length encoder/decoder 74. Further, the motion compensation portion 73 outputs the MB parameter of the macroblock being processed, the original image data, the search image data, and the differential image data to the converter/quantizer 74.

The converter/quantizer 74 applies DCT and quantization to the image data from the motion compensation portion 73 and outputs the coefficient data and the MB parameter for encoding to the variable length encoder/decoder 75. Further, it applies IDCT to the coefficient data to generate Y/Cb/Cr image data of the local decoded image and writes this in the frame memory 5.

The variable length encoder/decoder 75 encodes the motion vector data from the motion compensation portion 73 and the coefficient data and the MB parameter from the converter/quantizer 74 to generate a video stream. The video stream is successively written to the video ES buffer 8a.

On the other hand, in the decoding mode, when the variable length encoder/decoder 75 is instructed to start encoding for one picture, the variable length encoder/decoder 75, half-pell precision predictive encoding portion 72, motion compensation portion 73, and converter/quantizer 74 successively perform pipeline processing for each macroblock, whereby decoded image data is output from the converter/quantizer 74. At that time, the full-pell precision predictive encoding portion 71 does not operate. Further, the half-pell precision predictive encoding portion 72 does not detect motion, but transfers the motion vector data and the Y-image data to the motion compensation portion 73 by a similar path to the encoding mode.

The variable length encoder/decoder 75 encodes the video stream from the video ES buffer 8b and outputs the decoded motion vector data for every macroblock to the half-pell precision predictive encoding portion 72. Further, it outputs the decoded coefficient data to the converter/quantizer 74.

The half-pell precision predictive encoding portion 72 outputs the motion vector data from the variable length encoder/decoder 75 and the Y-image data of the image read from the frame memory 5 and decoded previously to the motion compensation portion 73.

The motion compensation portion 73 carries out motion compensation on the Y-image data from the half-pell precision predictive encoding portion 72 and the Cb/Cr image data read from the frame memory 5, then outputs the MB parameter of the macroblock being processed and the search image data to the converter/quantizer 74.

The converter/quantizer 74 applies quantization and IDCT to the coefficient data from the variable length encoder/decoder 75 to construct the decoded image data using the MB parameter and the search image data from the motion compensation portion 73 and writes it to the frame memory 5.

Note that when the resolution or the compression rate designated at the time of encoding is lower than a predetermined value, the MPEG encoding/decoding engine 7 can reduce the clock frequency to half to perform the encoding processing.

Note that the above image recording and reproducing apparatus can encode and decode individual systems of video signals in parallel. For example, it can encode and record on a recording medium a video signal received by a television tuner and simultaneously read, decode, reproduce, and output already recorded data from the recording medium.

Here, the above image recording and reproducing apparatus performs the encoding and decoding by a single MPEG encoding/decoding engine 7. Due to this, when performing encoding and decoding in parallel, the MPEG encoding/decoding engine 7 operates while alternately switching between the encoding mode and decoding mode. Further, as explained above, at both encoding and decoding, the frame memory 5 is shared. At the time of each processing, it is accessed by the video input processing portion 1, first image resealing portion 2, second image resealing portion 3, video output processing portion 4, etc. and is used as an active region by the MPEG encoding/decoding engine 7. Therefore, when simply alternately performing encoding and decoding, the transfer rate of the frame memory 5 has to make high in speed.

However, the number of accesses of the MPEG encoding/decoding engine 7 to the frame memory 5 is smaller at the time of decoding compared with encoding. Taking note of this, control is performed so as to access the frame memory 5 by the minimum necessary blocks by the MPEG encoding/decoding engine 7 etc. in the encoding processing and so as to access the frame memory 5 by the second resealing portion 3, access the image data for encoding by the first resealing portion 2, etc. in the decoding processing. Due to this, the accesses to the frame memory 5 are dispersed and evened out and the maximum necessary transfer rate is lowered. This is one of the characteristics of the present invention.

Further, the above image recording and reproducing apparatus can perform a plurality of systems of encoding in parallel. For example, it can encode and record on an optical disk a video signal from a television tuner and simultaneously encode and record on a portable semiconductor memory or output through a network the same video signal with a lowered resolution.

When performing a plurality of systems of encoding in parallel in this way, the above image recording and reproducing apparatus perform the different systems of processing alternately by a single MPEG encoding/decoding engine 7. At that time, since the frame memory 5 is shared by the different systems of processing and the frequency of access to the frame memory 5 becomes high, control is performed so as to access the frame memory 5 by the minimum necessary blocks by the MPEG encoding/decoding engine 7 etc. in the encoding processing by a high resolution and so as to operate the MPEG encoding/decoding engine 7b a lower clock frequency and during that time access the frame memory 5 by for example the first resealing portion 2 in the decoding processing by the low resolution. Due to this, the accesses to the frame memory 5 are dispersed and evened out and the maximum necessary transfer rate is lowered. This is another one of the characteristics of the present invention.

Here, the channels for access to the frame memory 5 in the above image recording and reproducing apparatus will be described. Table 1 shows a list of the access channels used.

TABLE 1

| ID | Access channel to frame memory |
|---|---|
| 0 | MPEG engine Image writing channel |
| 1 | MPEG engine Motion vector writing channel |
| 2 | First image rescaling portion Image writing channel |
| 3 | Second image rescaling portion Image writing channel |
| 4 | Video input processing portion Image writing channel |
| 5 | MPEG engine Motion vector/image reading channel (full-pell) |
| 6 | MPEG engine Image reading channel (half-pell) |
| 7 | MPEG engine Image reading channel (motion compensation portion) |
| 8 | First image rescaling portion Image reading channel |
| 9 | Second image rescaling portion Image reading channel |
| 10 | Video output processing portion Image reading channel |
| 11 | Refresh |

As shown in Table 1, the access channels to the frame memory 5 are identified by ID numbers. ID__0 is a channel by which the converter/quantizer 74 of the MPEG encoding/decoding engine 7 writes image data to the frame memory 5. This channel writes local decoded image data in the encoding mode and decoded image data in the decoding mode. ID__1 is a writing channel by which the full-pell precision predictive encoding portion 71 of the MPEG encoding/decoding engine 7 buffers the motion vector data at the frame memory 5 in the encoding mode.

ID__2 is a channel by which the first image resealing portion 2 writes reformatted and rescaled image data. ID__3 is a channel by which the second image resealing portion 3 writes rescaled image data. ID__4 is a channel by which the video input processing portion 1 writes input image data.

ID__5 is a channel by which the full-pell precision predictive encoding portion 71 of the MPEG encoding/decoding engine 7 reads out the Y-image data and the buffered motion vector data in the encoding mode. ID__6 is a channel by which the half-pell precision predictive encoding portion 72 of the MPEG encoding/decoding engine 7 reads out the Y-image data in the encoding and decoding operating modes. ID__7 is a channel by which the motion compensation portion 73 of the MPEG encoding/decoding engine 7 reads out the Cb/Cr image data in the encoding and decoding operating modes.

ID__8 is a channel by which the first image resealing portion 2 reads out the image data for processing. ID__9 is a channel by which the second image resealing portion 3 reads out image data for processing. ID__10 is a channel by which the video output processing portion 4 reads out decoded image data. ID__11 is a channel for refreshing the frame memory 5.

The access management table 6a lists in order the ID numbers designating the access channels so as to be synchronized with the processings of the blocks connected to the frame memory 5. The memory control portion 6 makes the frame memory 5 perform write operations or read operations corresponding to the access channels in the order listed in the access management table 6a. The video input processing portion 1, first image resealing portion 2, second image resealing portion 3, video output processing portion 4, and MPEG encoding/decoding engine 7 connected to the frame memory 5 successively perform the predetermined processings at the blocks in accordance with read and write operations corresponding to the access channels.

The content of the access management table 6a is rewritten with each processing carried out in the MPEG encoding/decoding engine 7. Specifically, the content is rewritten in accordance with the type of encoding or decoding, the I/B/P picture type, the resolution or compression rate designated at the time of encoding or decoding, or other parameter.

Figure 3:
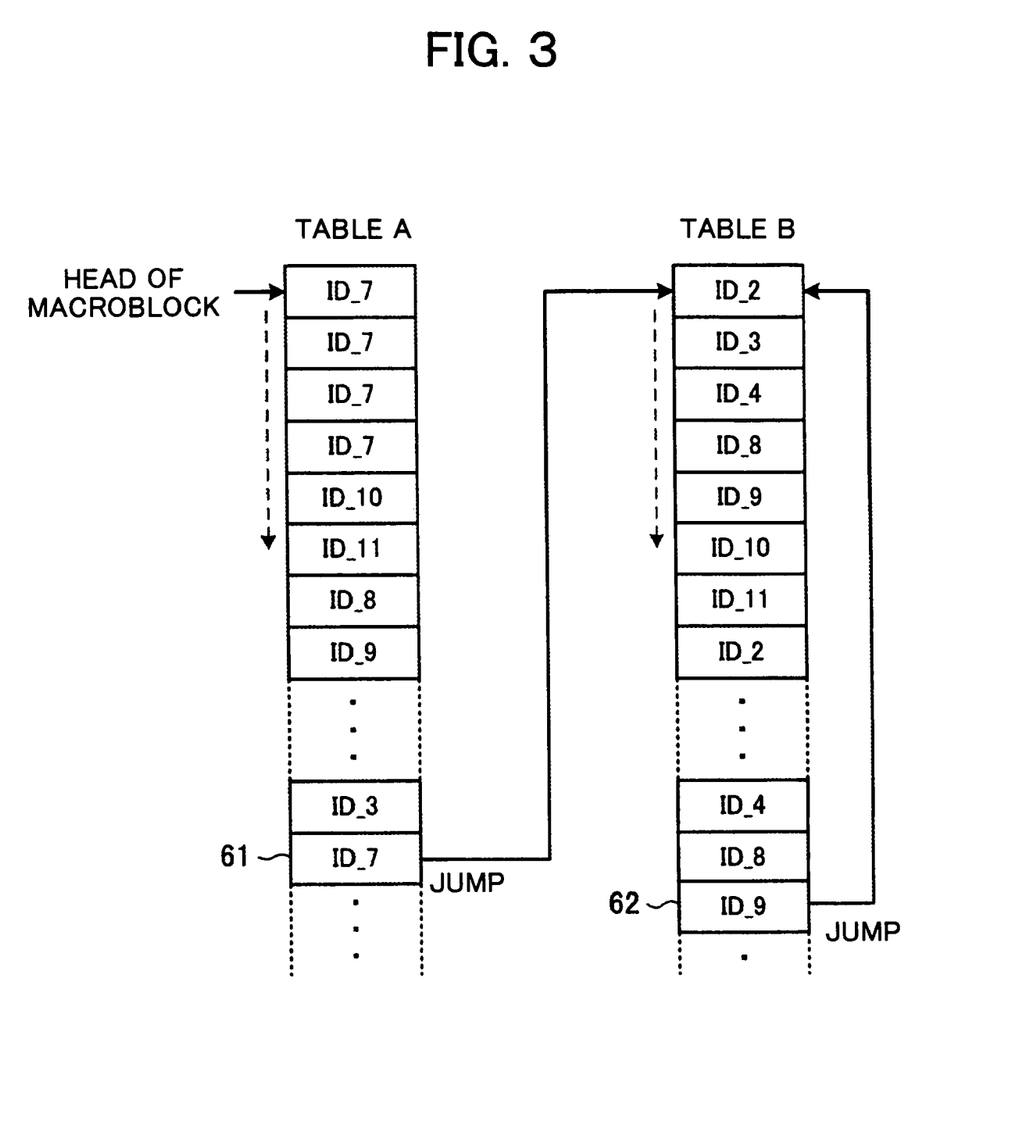
FIG. 3 is a view of the configuration of an access management table.

FIG. 3 is a view of the configuration of the access management table 6a.

As shown in FIG. 3, the access management table 6a has two tables A and B. The table A designates the access schedule during operation of the MPEG encoding/decoding engine 7, while the table B designates the access schedule while the operation of the MPEG encoding/decoding engine 7 is stopped. The tables A and B designate ID numbers showing the access channels in their slots. In the operation designated by one slot, 64 bytes are written into or read out from the frame memory 5.

The MPEG encoding/decoding engine 7 outputs a synchronization signal to the memory control portion 6 at the timing of starting a macroblock unit of processing. When the memory control portion 6 receives the synchronization signal, it resets a pointer to the access management table 6a to the head slot of the table A and starts control corresponding to the access channel designated by this slot. When access control for 64 bytes ends, the memory control portion 6 moves the pointer to the next slot, then performs access control designated by that slot.

In the case of the example shown in FIG. 3, the motion compensation portion 73 of the MPEG encoding/decoding engine 7 reads exactly one slot's worth of the Cb/Cr image data from the frame memory 5 based on the designation of the ID_7. Then, it performs similar access a further three times based on the designation of the ID_7, then the video output processing portion 4 reads out exactly one slot's worth of the decoded image data based on the designation of the ID_10. Further, access is controlled for one slot at a time in the order of the ID_11, ID_8, and ID_9.

The table A can be set with a jump command at any slot position. If such a jump command is set, after access control designated by the corresponding slot ends, the pointer jumps to the head slot of the table B, whereupon access control designated by the slots of the table B are successively performed. In the example shown in FIG. 3, a jump command is set at a slot 61. Due to this, after access control of the ID_7 designated at the slot 61 ends, control is performed for access of the ID_2 designated at the head slot of the table B.

Further, the table B can also be set with a jump command at any slot position. The pointer similarly jumps to the head slot of the table B. In the example shown in FIG. 3, the jump command is set at the slot 62. Due to this, after the access control of the ID_9 designated by the slot 62 ends, the pointer returns to the head slot of the table B, then access control of the ID_2 is carried out. After the pointer moves to the table B, access control designated from the head slot to the slot where the jump command is set is carried out repeatedly until receiving a synchronization signal from the MPEG encoding/decoding engine 7. The pointer is returned to the head slot of the table A at the timing of receipt of the synchronization signal, whereupon access control is carried out according to the table A.

As explained above, however, the MPEG encoding/decoding engine 7 outputs the synchronization signal at the timing of starting a macroblock unit of processing. The pointer in the access management table 6a is reset at the timing of its receipt. Further, the table A is set with a jump command at the position where the time for processing from the head slot to the slot set with the jump command becomes the period enabling one macroblock's worth of processing by the MPEG encoding/decoding engine 7 or more.

Therefore, during operation of the MPEG encoding/decoding engine 7, access control is carried out according to the table A, one macroblock's worth of processing is finished before reaching the jump command on the table A, the next macroblock processing is proceeded to, and the pointer is returned to the head slot of the table A. In this way, at the point of time where processing of all the macroblocks in one frame has been performed and the processing for the last macroblock is ended, the MPEG encoding/decoding engine 7 stops its operation. While the operation of the MPEG encoding/decoding engine 7 has stopped, the synchronization signal is not output, so the pointer on the table A is further advanced and access control is continued. When the pointer reaches the set position of the jump command, the pointer moves to the table B. After that, when the operation of the MPEG encoding/decoding engine 7 is resumed, the synchronization signal is output and the pointer is reset at the head slot of the table A.

Therefore, the table A designates the access schedule for the frame memory 5 during operation of the MPEG encoding/decoding engine 7, while the table B designates the access schedule for another block to access the frame memory 5 while the operation of the MPEG encoding/decoding engine 7 is stopped. Further, after the MPEG encoding/decoding engine 7 has finished one frame's worth of processing and while access control is being performed by the table B, the table A is rewritten in content according to the settings of the next decoding processing or encoding processing and the MPEG encoding/decoding engine 7 is restarted. At that time, the table B may also be rewritten if necessary.

By changing the access schedule to the frame memory 5 according to the processing for each frame in the MPEG encoding/decoding engine 7 in this way, encoding and decoding, or a plurality of systems of encoding, can be carried out in parallel while sharing the frame memory 5.

Next, the operations in the case of encoding and decoding in parallel and in the case of performing a plurality of systems of encoding in parallel will be described.

[Operation in Case of Encoding and Decoding]

When encoding and decoding in parallel, the MPEG encoding/decoding engine 7 set an encoding mode and a decoding mode by time division within one frame's worth of processing period, that is, within 1/30 second. Along with this, the access management table 6a designates separate access schedules for encoding and decoding. Further, when encoding, different access schedules are designated corresponding to whether the picture being processed is an I or P picture or a B picture.

Here, table 2 shows a list of the number of slots of the access channels designated for the access management table 6a in the different processing.

TABLE 2

Number of Slots of Access Channels Designated in Encoding/Decoding

|  |  | Table A | | | |
|---|---|---|---|---|---|
| ID | Access channel | I/P/B Decode | I/P Encode | B Encode | Table B |
| 0 | MPEG engine Image writing channel | 6 | 0 | 12 | 0 |
| 1 | MPEG engine Motion vector writing channel | 0 | 1 | 0 | 0 |
| 2 | First image rescaling portion Image writing channel | 10 | 0 | 0 | 10 |
| 3 | Second image rescaling portion Image writing channel | 10 | 0 | 0 | 10 |
| 4 | Video input processing portion Image writing channel | 5 | 5 | 5 | 5 |
| 5 | MPEG engine Motion vector/image reading | 0 | 21 | 28 | 0 |

TABLE 2-continued

Number of Slots of Access Channels Designated in Encoding/Decoding

| | | Table A | | | |
|---|---|---|---|---|---|
| ID | Access channel | I/P/B Decode | I/P Encode | B Encode | Table B |
| | channel (full-pell) | | | | |
| 6 | MPEG engine Image reading channel (half-pell) | 20 | 44 | 34 | 0 |
| 7 | MPEG engine Image reading channel (Motion compensation portion) | 12 | 14 | 8 | 0 |
| 8 | First image rescaling portion Image reading channel | 10 | 0 | 0 | 0 |
| 9 | Second image rescaling portion Image reading channel | 10 | 0 | 0 | 0 |
| 10 | Video output processing portion Image reading channel | 5 | 5 | 5 | 5 |
| 11 | Refresh | 1 | 1 | 1 | 1 |

When decoding and encoding in parallel, as shown in Table 2, the table A designates individual access schedules for the decoding mode of the MPEG encoding/decoding engine 7, the encoding mode when processing an I or P picture, and the encoding mode when processing a B picture. The table B designates the same access schedules for encoding and decoding. For example, when decoding I/B/P pictures, in table A, ID__0 designates six slots' worth of access, ID__2 and ID__3 10 slots' worth each, ID__4 five slots' worth, ID__6 20 slots' worth, ID__7 12 slots' worth, ID__8 and ID__9 10 slots' worth each, ID__10 five slots' worth, and ID__11 one slot's worth.

On the other hand, the MPEG encoding/decoding engine 7 has to access the frame memory 5 more in the encoding mode than the decoding mode. Therefore, as shown in Table 2, the number of slots of the access channels from the MPEG encoding/decoding engine 7 designated in the table A is greater in the encoding mode than the decoding mode. That is, the transfer rate of the frame memory 5 has to be made higher in the encoding mode. On the other hand, the MPEG encoding/decoding engine 7 is designed so that the time required for one macroblock's worth of encoding becomes the same as the time for one macroblock's worth of decoding.

Therefore, the table A can set more access channels for other than the MPEG encoding/decoding engine 7 in the decoding mode than in the encoding mode. As shown in Table 2, the access channels of the MPEG encoding/decoding engine 7, video input processing portion 1, and video output processing portion 4 are designated in the table A in the encoding mode and decoding mode, but the access channels of the first image rescaling portion 2 and the second image resealing portion 3 are designated in the table A only in the decoding mode and not in the encoding mode. However, the sums of the number of slots designated in the encoding mode and the decoding mode are almost the same, so the transfer rates required for the frame memory 5 can be made about the same.

Note that the number of the slots shown in Table 2 differ according to the designated resolution, compression rate, etc.

Figure 4:
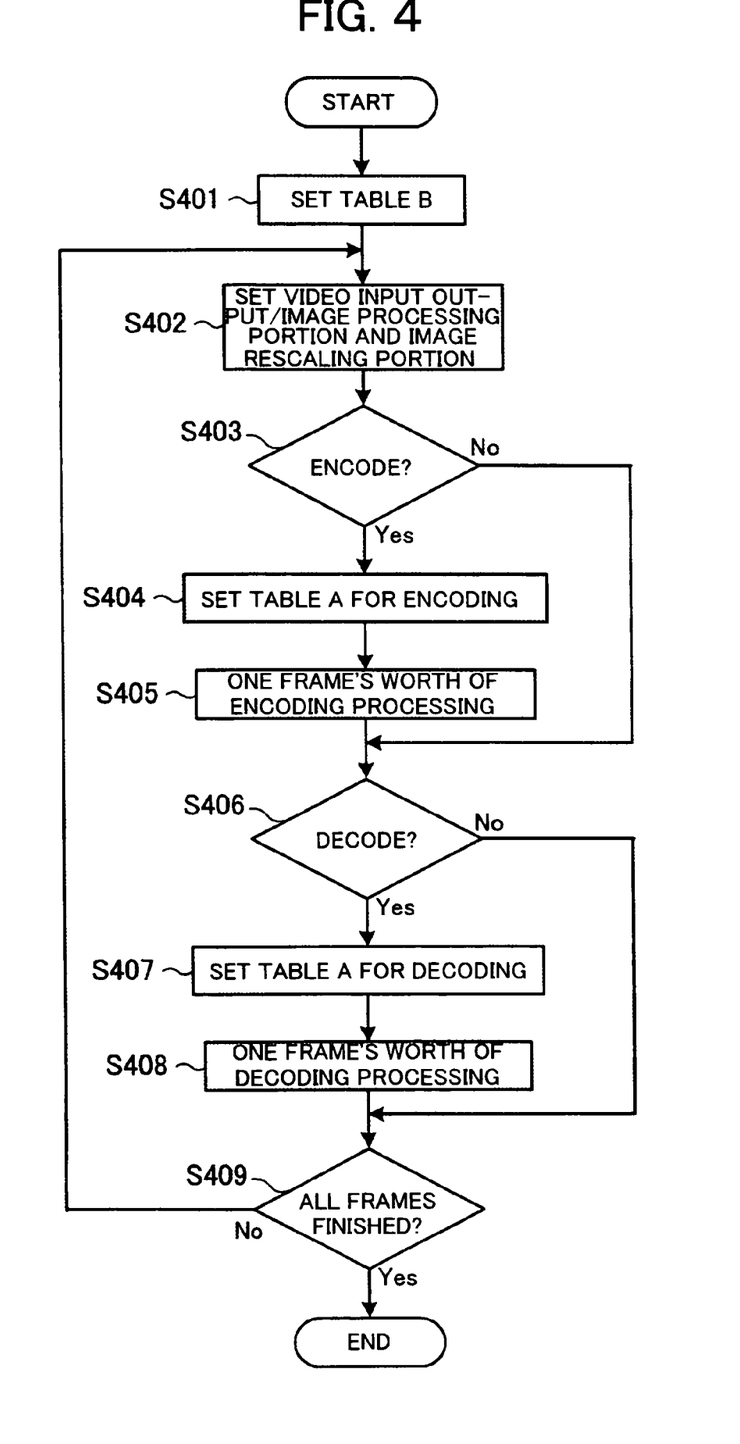
FIG. 4 is a flow chart showing the flow of the basic processing of the image recording and reproducing apparatus when encoding and decoding in parallel.

FIG. 4 is a flow chart of the flow of the basic processing of the image recording and reproducing apparatus when encoding and decoding in parallel.

The blocks and the memory control portion 6 accessing to the frame memory 5 are set according to instructions on the encoding/decoding operation input from a not shown input portion etc. or the settings of the resolution, compression rate, etc.

At step S401, the memory control portion 6 sets an access channel in the table B of the access management table 6a.

At step S402, based on the input setting, the video input processing portion 1 and the first image resealing portion 2 are set with various parameters in the case of encoding. In the case of decoding, the second image resealing portion 3 and the video output processing portion 4 are set with various parameters.

At step S403, the memory control portion 6 decides based on the input setting whether encoding is to be performed. If encoding is to be performed, the routine proceeds to step S404. At that time, the MPEG encoding/decoding engine 7 is set to the encoding mode. If encoding is not to be performed, the routine proceeds to step S406. At that time, the MPEG encoding/decoding engine 7 is set to the decoding mode.

At step S404, the memory control portion 6 sets the access channel for encoding in the table A according to the designated type of picture, resolution, compression rate, etc.

At step S405, the MPEG encoding/decoding engine 7 starts the encoding processing. The memory control portion 6 first starts the access control of the frame memory 5 according to the table A at the timing of receipt of the synchronization signal from the MPEG encoding/decoding engine 7. Then, after the operation of the MPEG encoding/decoding engine 7 stops, the memory control portion 6 ends the processing of the slot where a jump command is set at the table A, then performs access control according to the table B.

At step S406, the memory control portion 6 decides if decoding is to be performed based on the input setting. If decoding is to be performed, the routine proceeds to step S407. Note that if proceeding from step S405 to step S406, the MPEG encoding/decoding engine 7 is switched to the decoding mode after finishing the encoding processing at step S405. If decoding is not to be performed, the routine proceeds to step S409.

At step S407, the memory control portion 6 sets the access channel for decoding at the table A according to the designated type of picture, resolution, compression rate, etc.

At step S408, the MPEG encoding/decoding engine 7 starts the decoding processing. The memory control portion 6 first starts the access control of the frame memory 5 according to the table A at the timing of receiving the synchronization signal from the MPEG encoding/decoding engine 7. After the MPEG encoding/decoding engine 7 stops, the memory control portion 6 ends the processing of the slot where the jump command is set at the table A, then performs access control according to the table B.

Due to the above processing, one frame's worth of encoding and decoding are finished. At step S409, the MPEG encoding/decoding engine 7 decides whether the processing for all frames has been finished. If not, the routine returns to step S402.

Figure 5:
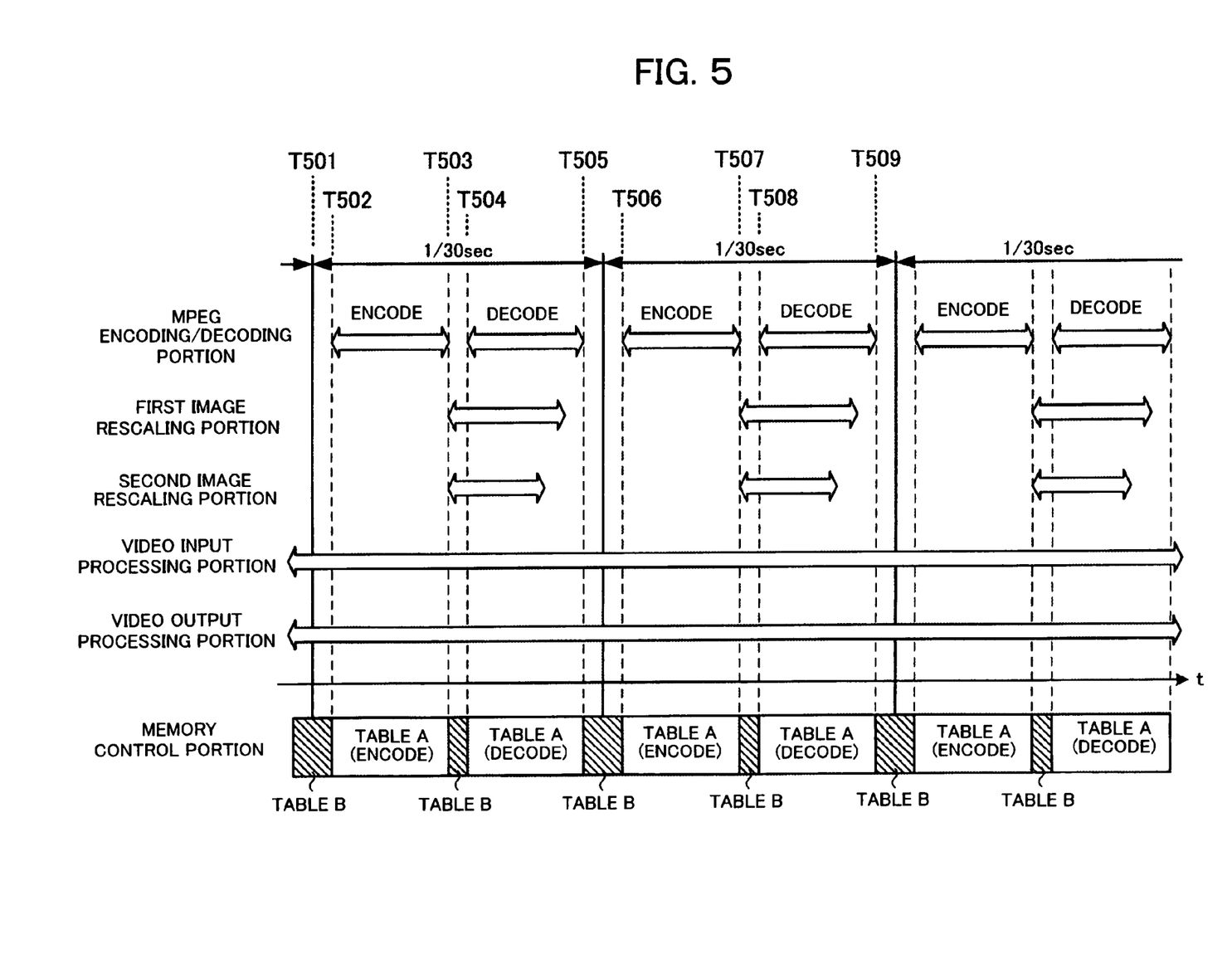
FIG. 5 is a time chart for explaining processing of different blocks when encoding and decoding in parallel.

Next, FIG. 5 is a time chart for explaining the processings of the different blocks.

As explained above, the MPEG encoding/decoding engine 7 performs encoding and decoding within one frame's work of processing period (1/30 seconds) in a time division manner. For example, if the processing period is started at the timing T501 in FIG. 5, the MPEG encoding/decoding engine 7 starts encoding at the timing T502 after that. Receiving the synchronization signal from the MPEG encoding/decoding engine 7 at that time, the memory control portion 6 moves the pointer to the head slot of the table A in the access management table 6a and performs access control to the frame memory 5 according to the table A. The access schedule in the table A corresponding to encoding does not include the access channels of the first image resealing portion 2 and the second resealing portion 3, so these blocks stop operation and do not access the frame memory 5.

Whenever the MPEG encoding/decoding engine 7 performs encoding for a macroblock, the memory control portion 6 repeats the access control based on the access schedule in the table A. Then, if having finished one frame's worth of encoding at the timing T503, the MPEG encoding/decoding engine 7 stops its operation. On the table A, the pointer reaches the slot where the jump command set, then the memory control portion 6 starts access control based on the access schedule in the table B. The table B includes the access channels of the first image resealing portion 2 and the second image resealing portion 3, so these blocks start operation and access the frame memory 5. During this period, the memory control portion 6 rewrites the table A to the access schedule for the next decoding.

Then, if the MPEG encoding/decoding engine 7 starts decoding at the timing T504, the memory control portion 6 starts the access control based on the table A. At that time, the table A includes the access channels of the first image resealing portion 2 and the second image resealing portion 3, so these blocks access the frame memory 5 while operating. If having finished one frame's worth of decoding at the timing T505, the MPEG encoding/decoding engine 7 stops its operation. The memory control portion 6 moves the pointer to the table B according to the jump command on the table A and performs access control based on the table B. Further, the table A is rewritten with the access schedule for the next encoding.

Note that, in the example shown in FIG. 5, the first image resealing portion 2 and the second image resealing portion 3 finish processing during the decoding process, so do not access the frame memory 5 during the access control based on the table B from the timing T505.

Then, the routine proceeds to the processing period for the next frame. At the timing T506, the MPEG encoding/decoding engine 7 starts encoding. Similar to the above, the memory control portion 6 performs access control of the frame memory 5 according to the table A. In this period, the first image resealing portion 2 and the second image resealing portion 3 stop operation and do not access the frame memory 5. Note that, depending on the type of the picture for encoding, the access schedule designated by the table A may differ from the timings T502 to T503.

Further, at the timing T507, one-frame's worth of encoding ends and access control is performed based on the table B. The MPEG encoding/decoding engine 7 stops operation and the blocks other than the MPEG encoding/decoding engine 7 access the frame memory 5. The table A is rewritten for the next decoding.

At the timing T508, the decoding is started. Access control is performed based on the table A until the timing T509 where the decoding ends. In this period, the first image resealing portion 2 and the second image enlarge reducing portion 3 also operate and access the frame memory 5.

In the above processing, for example, the image data processed by the first image resealing portion 2 and written to the frame memory 5 in the period of the timings T503 to T505 is read out to the MPEG encoding/decoding engine 7 and encoded in the period of the timings T506 to T507. Further, the image data in decoded and written to the frame memory 5 in the period of the timings T504 to T505 is read out and processed by the second image resealing portion 3 in the period of the timings T507 to T509.

In this way, due to the access control of the frame memory 5 using the access management table 6a, the MPEG encoding/decoding engine 7 accesses the frame memory 5 in encoding and decoding within one frame's worth of processing period in a time division manner. Therefore, encoding and decoding can be carried out in parallel using a single MPEG encoding/decoding engine 7 and a single frame memory 5, so an increase in circuit size is prevented.

Further, the first image resealing portion 2 and the second image resealing portion 3 do not access the frame memory 5 during encoding where the frequency of access to the frame memory 5 is high, but access it in other periods. Due to this, the transfer rates of the frame memory 5 required for encoding and decoding can be kept substantially the same and the peak transfer rate can be lowered. Therefore, a frame memory with a low transfer rate and relatively low component cost can be used.

[Operation in Case of Two Systems of Encoding]

Next, the operation in the case of a plurality of systems of encoding being performed in parallel will be described. In this case, the system of encoding set with the lower resolution requires a shorter encoding time. Therefore, at the time of the low resolution encoding, by lowering the clock frequency of the MPEG encoding/decoding engine 7, lowering the transfer rate to the frame memory 5, and controlling access to the frame memory 5 by the first image resealing portion 2 to be performed in this period, the peak transfer rate to the frame memory 5 can be lowered. Note that the rate of reduction of the clock frequency at the time of the low resolution may be set so that the encoding time of the low resolution system when lowering the clock frequency becomes similar to or shorter than the encoding time of the high resolution system by the ordinary clock frequency.

Next, the case of encoding an image of a standard (SD) size (720×480 pixels and 1350 macroblocks) and encoding an image of a common intermediate format (CIF) size (352×288 pixels and 396 macroblocks) in parallel will be described as an example. Note that, in the present embodiment, in the case of performing the two systems of encoding in parallel, it is assumed that the SD size image data is reformatted and rescaled by the first image resealing portion 2 and that the CIF size image data is reformatted and rescaled by the second image resealing portion 3.

When encoding a CIF size image, the number of macroblocks processed is less than ⅓ of the case of the SD size. Therefore, the time required for encoding a CIF size image is less than ⅓ of the case of the SD size. Due to this, when encoding a CIF size image, even if lowering the clock frequency of the MPEG encoding/decoding engine 7 to half that when encoding an SD size image, the time required for one frame's worth of encoding becomes shorter in the case of the CIF size than the SD size.

If halving the clock frequency of the MPEG encoding/decoding engine 7, the time required for processing one macroblock becomes double and the number of times the frame memory 5 can be accessed during this processing also becomes double. As a result, the access management table 6a can be set with a greater number of access channels other than the MPEG encoding/decoding engine 7.

Here, Table 3 shows a list of the number of slots of the access channels designated for the access management table 6a in the case of the encoding while halving the clock frequency.

TABLE 3

Number of Slots of Access Channel Designated in Encoding at Half Clock Frequency

| | | Table A | | |
|---|---|---|---|---|
| ID | Access channel | I/P Encode | B Encode | Table B |
| 0 | MPEG engine Image writing channel | 0 | 12 | 0 |
| 1 | MPEG engine Motion vector writing channel | 1 | 0 | 0 |
| 2 | First image rescaling portion Image writing channel | 20 | 20 | 10 |
| 3 | Second image rescaling portion Image writing channel | 20 | 20 | 10 |
| 4 | Video input processing portion Image writing channel | 10 | 10 | 5 |
| 5 | MPEG engine Motion vector/image reading channel (full-pell) | 21 | 28 | 0 |
| 6 | MPEG engine Image reading channel (half-pell) | 44 | 34 | 0 |
| 7 | MPEG engine Image reading channel (Motion compensation portion) | 14 | 8 | 0 |
| 8 | First image rescaling portion Image reading channel | 20 | 20 | 0 |
| 9 | Second image rescaling portion Image reading channel | 20 | 20 | 0 |
| 10 | Video output processing portion Image reading channel | 10 | 10 | 5 |
| 11 | Refresh | 2 | 2 | 1 |

When encoding a CIF size image at half the clock frequency, the table A is designates individual access schedules for the case of processing an I or P picture and the case of a B picture. In the case of encoding an SD size image at the ordinary clock frequency, the table A does not designate the access channels of the first image resealing portion 2 and the second image resealing portion 3. However, in the case of encoding a CIF size image at half the clock frequency, as shown in Table 3, the access channels of the first image resealing portion 2 and the second image resealing portion 3 can be written to the table A.

The table B designates access schedules similar to the encoding at the ordinary clock frequency shown in Table 2 due to the operation of the MPEG encoding/decoding engine 7 being stopped.

Figure 6:
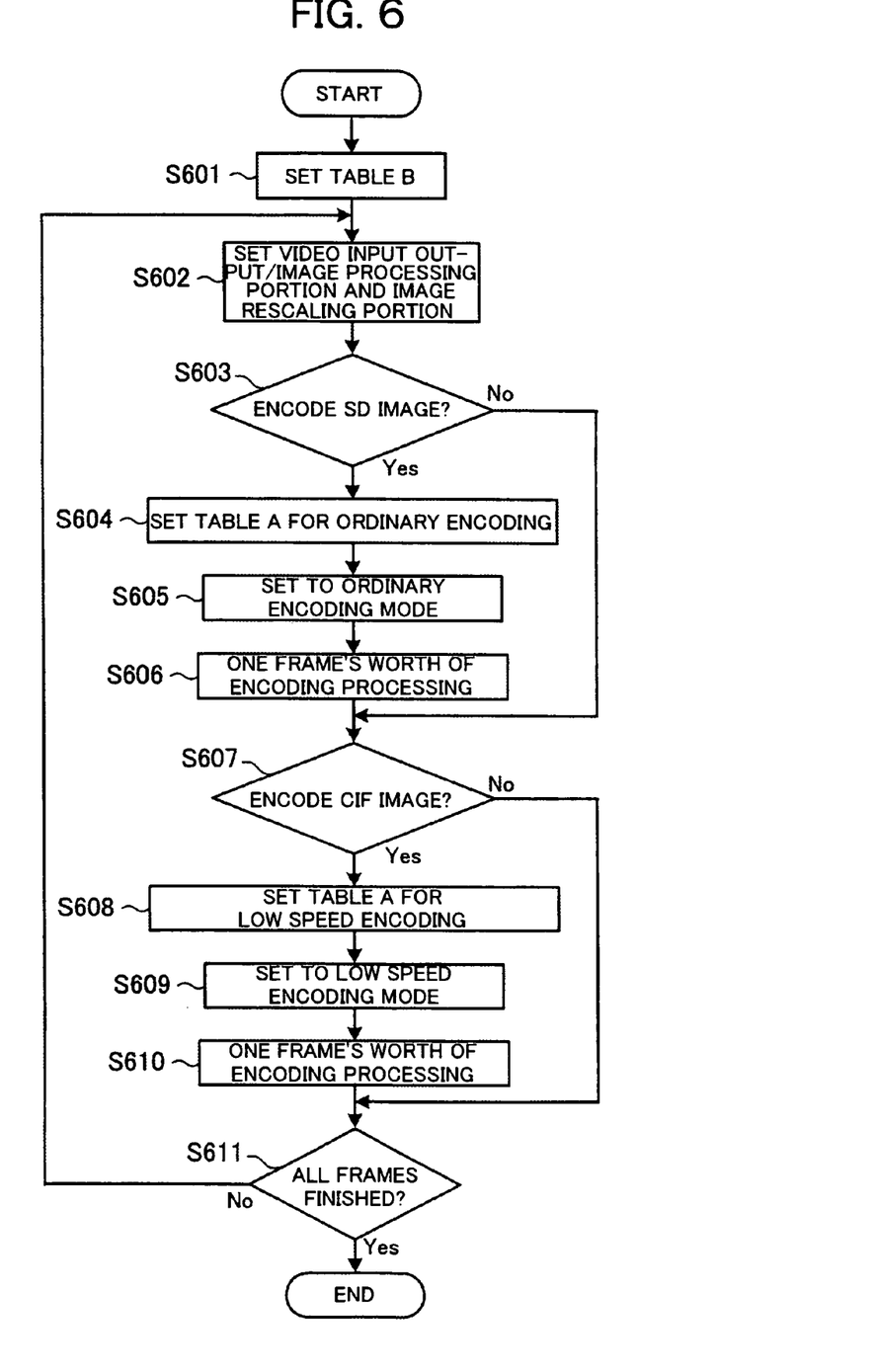
FIG. 6 is a flow chart showing the flow of the basic processing of the image recording and reproducing apparatus when encoding by two systems in parallel.

FIG. 6 is a flow chart of the flow of the basic processing in the image recording and reproducing apparatus when performing two systems of encoding in parallel.

Note that, in the following description, the operation mode in which the MPEG encoding/decoding engine 7 encodes at the ordinary clock frequency will be called the "ordinary encoding mode", while the operation mode in which it encodes at half the clock frequency will be called the "low speed encoding mode".

At step S601, the memory control portion 6 sets the access channels at the table B of the access management table 6a.

At step S602, based on the input settings, if encoding an SD size image, the video input processing portion 1 and the first image resealing portion 2 are set with various parameters. If encoding and decoding a CIF size image, the video input processing portion 1 and the second image resealing portion 3 are set with various parameters.

At step S603, the memory control portion 6 decides based on the input settings whether an SD size image is to be encoded. If yes, the routine proceeds to step S604. If no, the routine proceeds to step S607.

At step S604, the memory control portion 6 sets the access channels for the ordinary encoding mode at the table A according to the designated picture type, compression rate, etc. At step S605, the MPEG encoding/decoding engine 7 is set to the ordinary encoding mode.

At step S606, the MPEG encoding/decoding engine 7 starts the encoding processing of the SD size image. The memory control portion 6 first starts the access control of the frame memory 5 according to the table A at the timing of receipt of the synchronization signal from the MPEG encoding/decoding engine 7. Then, after the MPEG encoding/decoding engine 7 stops, the memory control portion 6 ends the processing of the slot where the jump command is designated at the table A and then performs access control according to the table B.

At step S607, the memory control portion 6 decides based on the input setting whether a CIF size image is to be decoded. If yes, the routine proceeds to step S608. If no, the routine proceeds to step S611.

At step S608, the memory control portion 6 sets the access channels for the low speed decoding mode at the table A according to the designated picture type, compression rate, etc. At step S609, the MPEG encoding/decoding engine 7 is set to the low speed encoding mode.

At step S610, the MPEG encoding/decoding engine 7 starts the decoding processing of the CIF size image. In the same way as step S606, the memory control portion 6 first starts the access control of the frame memory 5 according to the table A at the timing of receipt of the synchronization signal from the MPEG encoding/decoding engine 7. Then, after the MPEG encoding/decoding engine 7 stops, the memory control portion 6 ends the processing of the slot where the jump command is designated at the table A and then performs the access control according to the table B.

Due to the above processing, one frame's worth of encoding is completed for each of the SD size and CIF size image. At step S611, the MPEG encoding/decoding engine 7 decides whether all of the frames have finished being processed. If not finished, the routine returns to step S602.

Figure 7:
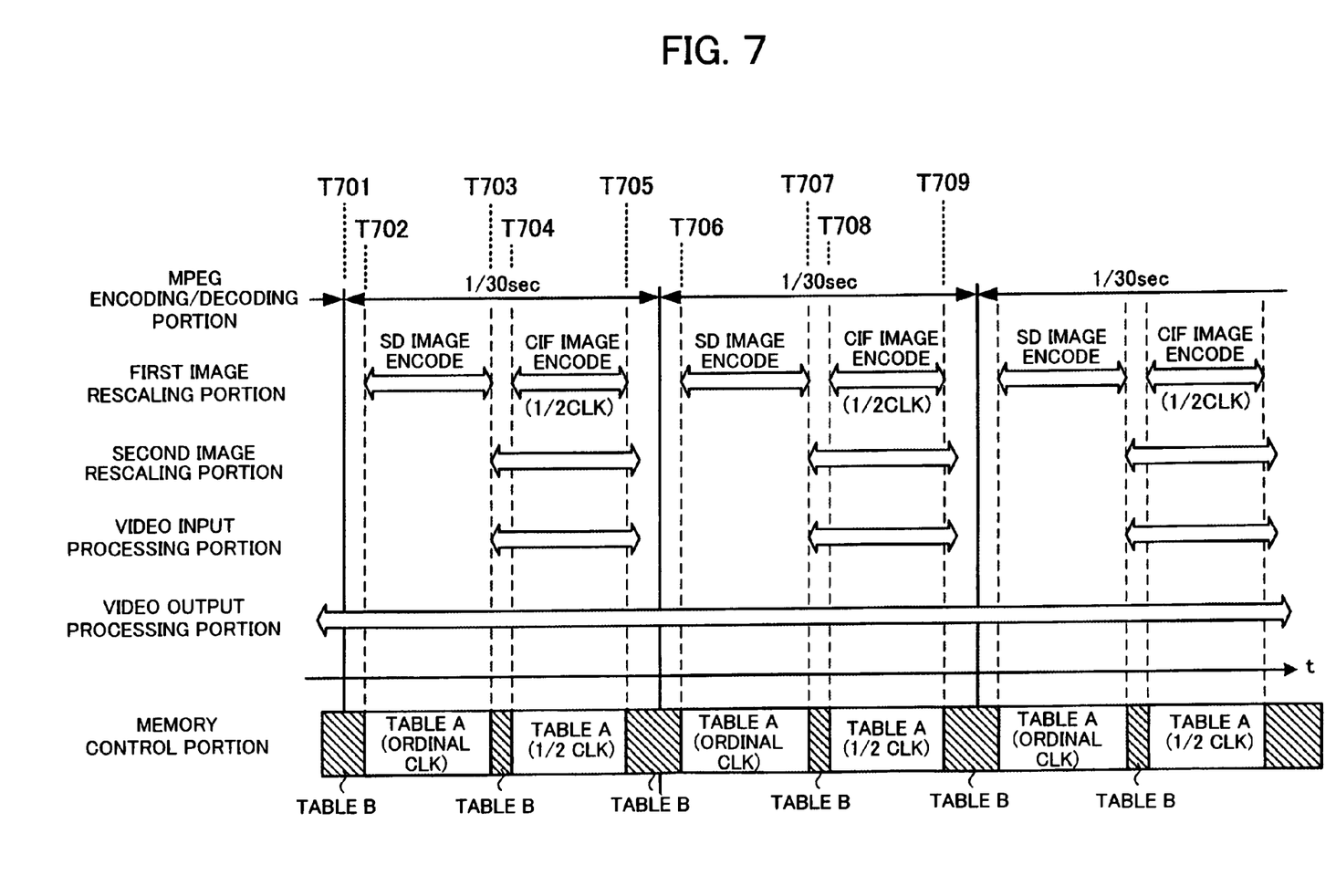
FIG. 7 is a time chart for explaining processing of different blocks when encoding by two systems in parallel.

Next, FIG. 7 is a time chart for explaining the processing of the different blocks.

The MPEG encoding/decoding engine 7 performs the encoding for the SD size image and the encoding for the CIF size image within one frame's worth of processing period (1/30 seconds) in a time division manner. For example, if the processing period is started at the timing T701 in FIG. 7, the MPEG encoding/decoding engine 7 starts the encoding processing of the SD size image at the timing T702. At that time, the memory control portion 6 receives the synchronization signal from the MPEG encoding/decoding engine 7, moves the pointer to the head slot of the table A in the access management table 6a, and performs access control to the frame memory 5 according to the table A. The access schedule in the table A corresponding to encoding for the ordinary clock mode does not include the access channels of the first image resealing portion 2 and the second image resealing portion 3, so these blocks stop operation and do not access the frame memory 5.

Whenever the MPEG encoding/decoding engine 7 encodes a macroblock, the memory control portion 6 repeats the access control based on the access schedule in the table A. Then, at the timing T703, if finishing one frame's worth of encoding processing, the MPEG encoding/decoding engine 7 stops its operation. The memory control portion 6 moves the pointer at the table B according to the jump command on the table A and performs access control based on the access schedule on the table B. The table B includes access channels of the first image resealing portion 2 and the second image resealing portion 3, so these blocks start operation and access the frame memory 5. During this period, the memory control portion 6 rewrites the table A to the access schedule for the next low speed encoding mode.

Then, at the timing T704, when the MPEG encoding/decoding engine 7 starts the encoding processing of the CIF size image at half the clock frequency, the memory control portion 6 starts the access control based on the table A. At that time, the table A includes access channels of the first image resealing portion 2 and the second image resealing portion 3, so these blocks access the frame memory 5 while operating. At the time T705, if finishing one frame's worth of the encoding processing, the MPEG encoding/decoding engine 7 stops its operation. The memory control portion 6 moves the pointer to the table B according to the jump command on the table A and performs the access control based on the table B. Further, the table A is rewritten to the access schedule for the next ordinary encoding mode.

Then, the routine proceeds to the processing period for the next frame. At the timing T706, the MPEG encoding/decoding engine 7 starts the encoding processing of the SD size image. In the same way as the above, the memory control portion 6 performs the access control of the frame memory 5 according to the table A. During this period, the first image resealing portion 2 and the second image resealing portion 3 stop operation and do not access the frame memory 5.

Further, at the timing T707, one frame's worth of the encoding is finished and access control is performed based on the table B. The MPEG encoding/decoding engine 7 stops its operation, and other blocks access the frame memory 5. Further, the table A is rewritten for the next low speed encoding mode.

Further, at the timing T708, the encoding at half the clock frequency is started. Access control is performed based on the table A until the timing T709 for ending the encoding. During this period, the first image resealing portion 2 and the second image resealing portion 3 operate and access the frame memory 5.

In the above processing, for example, the image data processed by the first image resealing portion 2 and written to the frame memory 5 in the period of the timings T703 to T705 is read out to the MPEG encoding/decoding engine 7 and encoded in the period of the timings T706 to T707. Further, the image data processed by the second image resealing portion 3 and written to the frame memory 5 in the same period is read out to the MPEG encoding/decoding engine 7 and encoded in the period of the timings T708 to T709.

By access control of the frame memory 5 using the access management table 6a in this way, the MPEG encoding/decoding engine 7 accesses the frame memory 5 accompanying encoding of SD size and CIF size images within one frame's worth of processing period in a time division manner. Therefore, two systems of encoding can be performed in parallel using a single MPEG encoding/decoding engine 7 and a single frame memory 5, and an increase in the circuit size is prevented.

Further, the first image resealing portion 2 and the second image resealing portion 3 do not access the frame memory 5 at the time of the ordinary encoding mode where the frequency of access to the frame memory 5 is high, but access it in other periods such as the low speed encoding mode. Due to this, the transfer rates of the frame memory 5 required at the times of encoding the SD size and CIF size images can be kept substantially the same and the peak transfer rate can be lowered. Therefore, a frame memory 5 with a low transfer rate and relatively low component cost can be used.

Due to this, the above image recording and reproducing apparatus can perform encoding and decoding in parallel and can perform two systems of encoding having different resolutions simultaneously even if small in size and low in cost. Further, by using an access management table 6a having two tables, it becomes possible to manage access schedules for lowering the transfer rate required for the frame memory 5 more efficiently.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus able to encode and decode moving images, comprising:
    temporary storage means including a memory for temporarily storing data,
    encoding/decoding processing means for reading and writing data successively with respect to the temporary storage means and encoding and decoding the image data in parallel, and
    storage control means for controlling the read and write operations of the data with respect to the temporary storage means, wherein
    the storage control means controls the read and write operations with respect to the temporary storage means by the encoding/decoding processing means in the encoding processing and at least read and write operations to the temporary storage means by the encoding/decoding processing means in the decoding processing so as to be performed within one frame's worth or one field's worth of processing period in a time division manner,
    when said encoding/decoding processing means encodes the same image data by a plurality of systems having different resolutions, said storage control means controls read and write operations with respect to said temporary storage means by said encoding/decoding processing means in said encoding processing by the plurality of systems so as to be performed within one frame's worth or one field's worth of processing period in a time division manner, and said encoding/decoding processing means operates lowered in clock frequency in said encoding processing other than when at least the highest resolution is set in the plurality of systems.

2. An image processing apparatus as set forth in claim 1, further comprising:
    input image converting means for reformatting and rescaling input image data to generate image data for encoding by said encoding/decoding processing means and writing said image data to said temporary storage means, wherein
    said storage control means controls read and write operations with respect to said temporary storage means by said input image converting means so as to be performed in a period other than the read and write operations with respect to said temporary storage means by said encoding/decoding processing means at the time of said encoding processing.

3. An image processing apparatus as set forth in claim 1, further comprising:
    output image converting means for rescaling the decoded image data generated by said decoding processing of said encoding/decoding processing means, wherein
    said storage control means controls read and write operations with respect to said temporary storage means by said output image converting means so as to be performed in a period other than read and write operations with respect to said temporary storage means by said encoding/decoding processing means at the time of said encoding processing.

4. An image processing apparatus encoding the same moving images by a plurality of systems having different resolutions, comprising:

temporary storage means including a memory for temporarily storing data;

encoding processing means for successively reading and writing data with respect to said temporary storage means and encoding image data in parallel; and storage control means for controlling read and write operations of data with respect to said temporary storage means; wherein said storage control means controls read and write operations with respect to said temporary storage means by said encoding processing means in said different systems of encoding processing so as to be performed within one frame's worth or one field's worth of processing period in a time division manner, and said encoding processing means operates lowered in clock frequency in said encoding processing other than when set to at least the highest resolution in said plurality of systems.

5. An image processing method for encoding the same moving images by a plurality of systems having different resolutions in parallel, comprising:

successively reading and writing data to a memory temporarily storing data and encoding image data by a plurality of systems in parallel;

lowering a clock frequency at said encoding processing other than when setting at least the highest resolution in the plurality of systems; and controlling read and write operations with respect to said memory in said plurality of systems of encoding processing so as to be performed within one frame's worth or one field's worth of processing period in a time division manner.

* * * * *